May 21, 1963  H. TANKUS  3,090,627
TANDEM SEAL
Filed Dec. 21, 1959
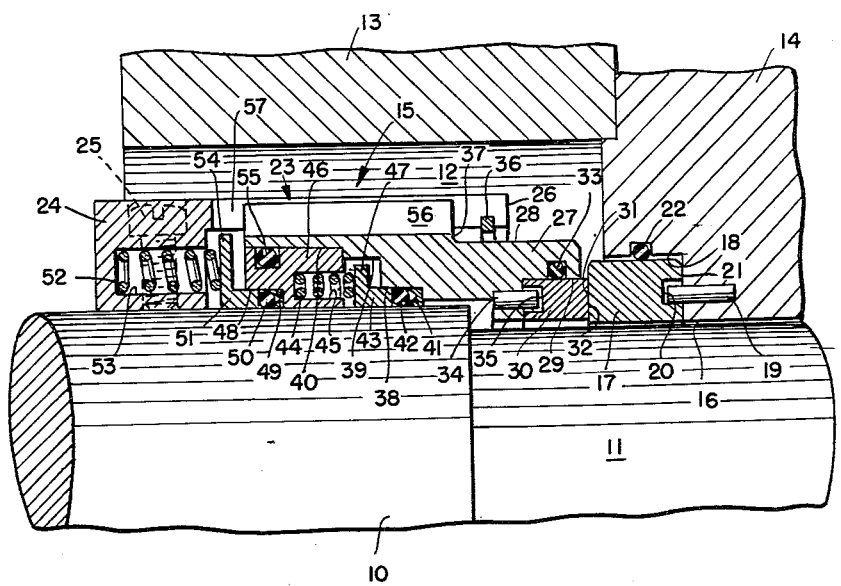
*INVENTOR:*
HARRY TANKUS
BY
Charles J. Vojtech
ATT'YS

United States Patent Office 3,090,627
Patented May 21, 1963

3,090,627
TANDEM SEAL
Harry Tankus, Wilmette, Ill., assignor to Crane Packing Company, Morton Grove, Ill., a corporation of Illinois
Filed Dec. 21, 1959, Ser. No. 860,881
4 Claims. (Cl. 277—85)

This invention relates to rotary mechanical seals.

It is an object of this invention to provide, in a single mechanical seal, two flexible sealing elements which function in tandem such that should one element fail, the other is instantly effective to take the place of the one that failed.

Another object of this invention is to provide a rotary mechanical seal having a first flexible sealing element exposed to the fluid to be sealed, and a second element exposed to the atmosphere and preventing the first seal from coming in contact with the atmosphere, thereby functioning as a dust shield for the first seal.

A more specific object of this invention is to provide a mechanical seal which utilizes two separate and independent flexible sealing elements in tandem, said sealing elements being identical in form and interchangeable.

These and other objects of this invention will become apparent from the following detailed description when taken together with the accompanying drawing, the sole FIGURE of which is a longitudinal section through an illustrative application of this invention.

Referring now to the drawing, the seal there depicted is especially adapted for sealing high pressure fluids and, by an appropriate choice of materials, can be used for high temperature fluids. To handle high pressures, the seal is shown as an hydraulically balanced seal and is used with a shaft 10 formed with a step or reduced diameter 11. Shaft 10 passes through a chamber 12 in a housing 13 of the apparatus to be sealed, which may be a centrifugal pump, for example. Chamber 12 is partly closed by an end cover 14 which may be appropriately sealed with respect to housing 13 and which extends radially inwardly into close proximity to the reduced diameter section 11 of shaft 10.

The rotary mechanical seal of this invention is shown generally at 15 and is effective to provide a running seal between end cover 14 and shaft 10. It may be assumed that the fluid to be sealed occupies chamber 12 and that the annular region 16 around step 11 is continuously exposed to and in communication with the exterior of housing 13 and the atmospheric conditions prevailing there. It frequently occurs that the pump may be located at a place exposed to dust and dirt which may find its way into annular region 16 and into contact with seal 15.

The fluid in chamber 12 is effectively contained therein by seal 15 and to this purpose, the said seal is comprised of a seat element 17 in the form of a ring of appropriate hard material received in a recess 18 formed in end cover 14 adjacent step 11. Seat element 17 is held against rotation relative to cover 14 by a pin 19 pressed into an opening in cover 14 and extending axially into a recess 20 formed in a radially disposed face 21 in seat element 17. A seal ring in the form of an endless O ring 22 of known construction and composition for the fluids and pressures to be encountered is compressed between end cover 14 and seat element 17 to form a fluid-tight seal between ring 22 and cover 14.

On shaft 10 is a seal retainer 23 which fits snugly upon shaft 10 at its inner end 24 and is fixed to shaft 10 against axial and rotary movement relative thereto by a set screw 25. The forward end 26 is hollowed and telescopes over a sleeve 27 which has a reduced diameter portion 28 extending out of retainer 23 toward end cover 14. A snap ring 36 in forward end 26 cooperates with the shoulder 37 formed by the reduced portion 28 to limit movement of sleeve 27 out of retainer 23. Sleeve 27, in turn, has a recess 29 in which is received a seal washer 30 extending outwardly toward and contacting seat element 17. The contacting radially disposed surfaces 31, 32 on the seat and washer respectively are made perfectly smooth and are lapped to provide a fluid-tight running fit between the seat and washer. The washer is sealed with respect to sleeve 27 by an endless O ring 33 compressed between the sleeve and washer. A pin 34 fixed to, and extending axially outwardly from, sleeve 27 is received in a recess 35 in washer 30 and prevents relative rotation between the said sleeve and washer.

The seal between sleeve 27 and shaft 10 is effected by the novel means now to be described.

Sleeve 27 is formed with three counterbores 38, 39 and 40. In counterbore 38 is located a first sealing element 41 which may be an endless ring of V shape in radial cross section and made of resilient deformable material. Said first element 41 is expanded against counterbore 38 and contracted against shaft 10 by an O ring 42 of known construction to form a fluid-tight seal between sleeve 27 and shaft 10. The expansion and contraction forces are derived from a rigid spring washer 43 which is urged axially against O ring 42 by one or more axially directed springs 44 extending outwardly from recesses 45 in a ring 46 telescoped into counterbore 40 with a slip fit therein. Spring washer 43 has a radially outwardly extending flange 47 by which the said washer 43 is reached by springs 44, said flange being disposed in counterbore 39 in which it has ample clearance.

Ring 46 has a recess 48 facing shaft 10 in which is located a second seal element 49 which may be identical in shape and size with element 41. An O ring 50 serves as a spreader element for expanding element 49 into recess 48 and contracting it against shaft 10. The expansion and contraction forces are derived from a second spring ring 51 which is urged axially against O ring 50 by one or more springs 52 extending axially outwardly from spring recesses 53 in the inner end 24 of retainer 23. Spring ring 51 is reached by springs 52 through a radially extending flange 54 on ring 51.

A fluid-tight seal is effected between sleeve 27 and ring 46 by an O ring 55 compressed therebetween.

It may be observed that the axially fixed inner end 24 of sleeve 23 serves as the abutment or reaction means for springs 52, and that the force of these springs is used to spread second seal element 49, and through the latter, urges ring 46 forward in its counterbore 40 toward the first seal element 41. The reaction force of springs 44 is thus likewise provided by springs 52 which must therefore be sufficiently strong to function as intended. It may be observed, however, that the full force of springs 52 is not borne by springs 44, but is limited to holding ring 46 against the shoulder 55 formed between counterbores 39 and 40, and thereby urging washer 30, through sleeve 27 against ring 17.

Sleeve 27 is prevented from rotating relative to retainer 24 by a mechanical interlocking arrangement comprising ears 56 on sleeve 27 extending outwardly into slots 57 in the forward end 26 of retainer 23. Slots 57 are longer in an axial direction than ears 56 to allow sleeve 27 and its washer 30 to move axially relative to retainer 23 under the action of springs 52.

In operation, shaft 10 is rotated and the seal 15 is rotated with it. Springs 52 urge spring washer 51 into recess 48 and against O ring 50 to spread seal element 49 radially inward and outward to effect a fluid-tight seal between shaft 10 and ring 46. The force of said springs is thus transmitted to sleeve 27 to urge said sleeve in the same direction and thereby hold seal washer 30 in recess 29 against seat element 17 to effect a running seal between seal washer 30 and seat element 17. A primary seal is effected between seal washer 30 and shaft 10 through the intervening O ring 33, O ring 55, seal element 49, and the connecting sleeve 27 and ring 46. This primary seal is relied upon to seal the opening between end cover 14 and shaft 10.

A secondary seal is simultaneously effective between shaft 10 and sleeve 27 through seal element 41 which is spread radially by O ring 42, the latter being urged against element 41 by spring washer 43 and springs 44 reacting against ring 46. This secondary seal is continuously effective to prevent dirt from passing along shaft 10 to primary seal 49 and thus helps to prolong the life of the primary seal. Should the primary seal fail for any reason, then the secondary seal will be effective to take up the function of the primary seal.

It is understood that the foregoing description is merely illustrative of a preferred embodiment of the invention and that the scope of the invention is not to be limited thereto but is to be determined by the appended claims.

I claim:

1. A rotary mechanical seal for relatively rotatable members, said seal including a seal seat on one member, an axially movable sealing washer means encircling the other member, a retainer fixed to the said other member, said sealing washer means having a recess therein opening upon the other member, a reaction ring substantially closing off the recess, a radially distortable sealing ring disposed in the recess and providing a seal between the sealing washer means and the said other member, a spreader ring adjacent the radially distortable ring and adapted to distort said distortable ring upon the application of axial pressure to the spreader ring, spring means compressed between the reaction ring and the spreader ring to apply axial pressure to said spreader ring, said reaction ring having a recess therein opening upon the said other member, a radially distortable sealing ring disposed in the recess in the reaction ring and providing a seal between the reaction ring and the said other member, a second spreader ring adjacent the last mentioned radially distortable sealing ring and adapted to distort said distortable ring upon the application of axial pressure to the second spreader ring, and spring means compressed between the retainer fixed to the said other member and the second spreader ring to apply axial pressure to said second spreader ring.

2. A rotary mechanical seal as described in claim 1, said reaction ring being axially slidable in said recess, a shoulder in the recess limiting axial movement of the reaction ring toward the first mentioned radially distortable sealing ring, and sealing means interposed between the reaction ring and the sealing washer means.

3. In a rotary mechanical seal for relatively rotatable members, said seal including a pair of relatively rotatable sealing elements, one of said elements being associated with one member and the other being associated with the other of said members, the combination of first and second radially distortable sealing means axially spaced from one another on the said one member, said first radially distortable sealing means contacting the sealing element associated with the said one member, a reaction ring interposed between the second radially distortable sealing means and the sealing means associated with the said one member, axially movable means interposed between the reaction ring and the first radially distortable sealing means, a reaction device fixed to the said one member, and axially movable means interposed between the last-mentioned reaction device and the second radially distortable means, both said axially movable means being effective to distort their respective radially distortable sealing means, said reaction ring being axially movable relative to the said one member, and an abutment on the sealing element associated with the said one member and limiting axial movement of the reaction ring.

4. In a rotary mechanical seal for relatively rotatable members, said seal including a pair of relatively rotatable sealing elements, one of said elements being associated with one member and the other being associated with the other of said members, the combination of first and second radially distortable sealing means axially spaced from one another on the said one member, said first radially distortable sealing means contacting the sealing element associated with the said one member, a reaction ring interposed between the second radially distortable sealing means and the sealing means associated with the said one member, axially movable means interposed between the reaction ring and the first radially distortable sealing means, a reaction device fixed to the said one member, and axially movable means interposed between the last-mentioned reaction device and the second radially distortable means, both said axially movable means being effective to distort their respective radially distortable sealing means, said reaction ring being axially movable relative to the said one member, and packing interposed between the reaction ring and the said one sealing element.

References Cited in the file of this patent

UNITED STATES PATENTS

| | | |
|---|---|---|
| 2,760,794 | Hartranft | Aug. 28, 1956 |
| 2,824,759 | Tracy | Feb. 25, 1958 |
| 2,928,685 | Tracy | Mar. 15, 1960 |